INVENTOR
RAIMO BAKIS
BY Francis J. Thomas
ATTORNEY

VERTICAL DISTRIBUTION OF VIDEO

VERTICAL SWEEP GENERATOR

HORIZONTAL SWEEP GENERATOR

HEIGHT TRACKING CIRCUIT 3,350,505

SCANNING APPARATUS EMPLOYING MEANS COMPENSATING FOR VARIATIONS IN CHARACTER HEIGHT AND WIDTH AND FOR VARIATIONS IN THE POSITION OR LINEARITY OF LINES OF PRINT

Raimo Bakis, Ossining, N.Y., assignor to International Business Machines Corporation, New York, N.Y., a corporation of New York Filed Feb. 18, 1964, Ser. No. 345,746
8 Claims. (Cl. 178—6.8)

This invention relates to an automatically adjusted scanner for use in a pattern recognition system and, in particular, to a scanner for use in reading documents having lines of print that vary in size and registration.

The inventive scanner automatically compensates for variations in character height and width and for variations in the position or linearity of lines of print. This improved scanner can be used with conventional recognition apparatus to enhance the operation of this apparatus in that a variety of print fonts and document formats are accommodated without manual adjustment of the recognition apparatus.

In the present invention, the operation of a sequential, point-by-point optical scanner, such as a flying-spot cathode ray tube scanner, a camera tube or image dissector, or a mechanical scanning mechanism, is regulated by a control circuit which monitors the scanner output to correct the scanning pattern to compensate for deviations in the print font and document format.

In the preferred embodiment, a cathode ray tube scanner produces a movable spot of light (raster) whose position is determined by horizontal and vertical sweep voltages that are applied to the scanner. The raster is directed at the document and a photomultiplier generates a video signal that is representative of the optical contrast present on the document in the form of printing. This video signal is applied to a conventional recognition system and to the inventive control circuit. As a horizontal line of printing is scanned by a sequence of adjacent vertical lines, the vertical distribution of the resulting video signals is analyzed to determine the height of the characters and vertical positions of the line of printing. The character height is normalized by an automatic adjustment of the vertical sweep speed of the flying spot scanner. That is, when characters are taller than normal, the sweep speed is increased and when characters are shorter than normal, the sweep speed is decreased. In this manner, the time required to scan characters from top to bottom is relatively constant, regardless of the size of the characters. Since the width of characters is generally related to their height, the horizontal sweep speed is also adjusted when the character height varies.

The location of the line of printing on the document is also monitored and the vertical sweep signals to the cathode ray tube are continuously controlled to compensate for variations in the line of print, such as skew or the various non-linearities and distortions that are introduced by the optical system.

It is thus a primary object of the present invention to provide automatically-controlled scanning techniques for use with recognition systems.

Another object is to provide scanning techniques for use with recognition systems, wherein compensation for variations in type font is automatically accomplished.

Another object is to provide scanning techniques for use with recognition systems, wherein compensation for variations in character height is automatically accomplished.

Another object is to provide scanning techniques for use with recognition systems, wherein compensation for variations in character width is automatically accomplished.

Another object is to provide scanning techniques for use with recognition systems, wherein compensation for variations in character height and width is automatically accomplished.

A further object is to provide scanning techniques for use with recognition systems, wherein lines of printing are substantially tracked or followed, even though skewed, non-linear or distorted.

The foregoing and other objects, features and advantages of the invention will be apparent from the following more particular description of a preferred embodiment of the invention, as illustrated in the accompanying drawings.

Figure 1:
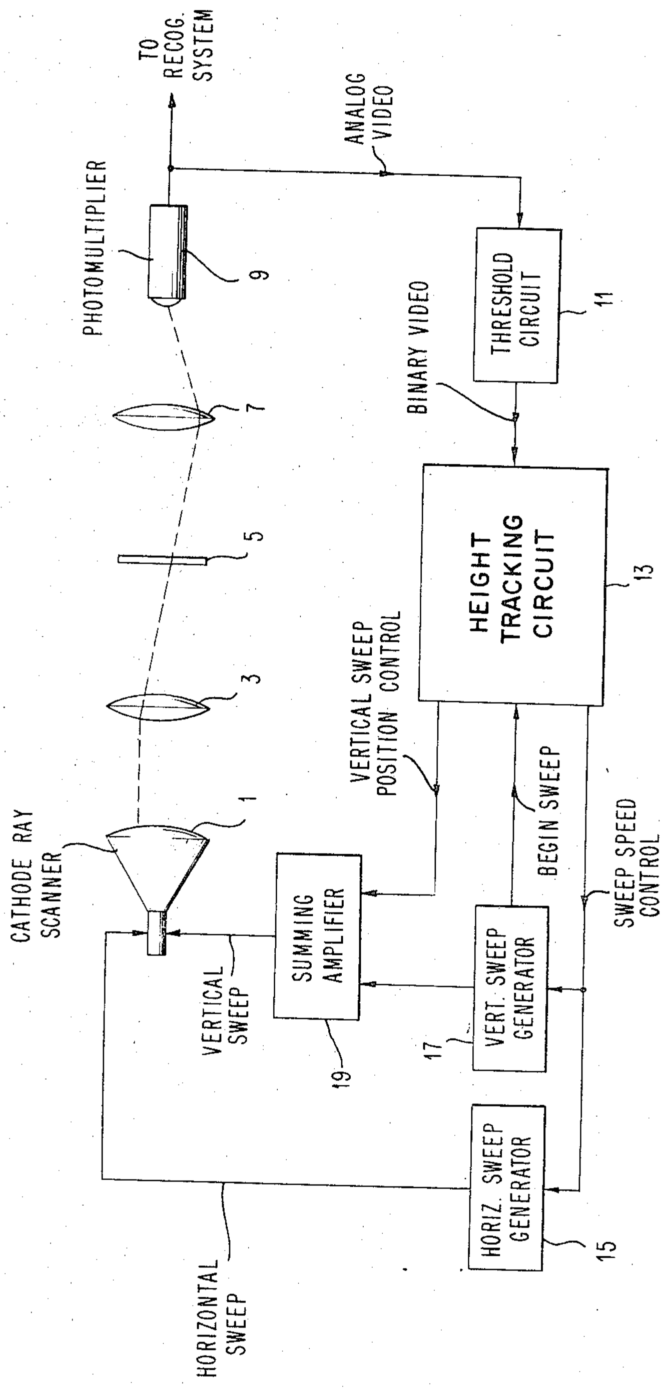
FIG. 1 is a diagram illustrating the preferred embodiment of the invention.

As illustrated in FIGURE 1, a cathode ray scanner 1 directs a beam of light through a lens 3 at a transparent document 5. The light transmitted by the document is passed through another lens 7 to a photomultiplier 9. As the transparency 5 is scanned, a time-varying analog video signal is generated by the photomultiplier, where the instantaneous value of the signal is a function of the opacity of the transparency at the region at which the beam of light is directed. In this manner, as the transparency is subjected to a scanning raster, video signals are generated which are representative of the shape of the characters on the transparency. Obviously, light can be reflected by a non-transparent document instead of being transmitted by the transparent document of FIGURE 1.

The video signals generated by the photomultipler are applied to a conventional recognition system which is not shown. These signals are also applied to the scanner control circuitry of FIGURE 1 where they are converted to binary signals by a threshold circuit 11 and applied to a height tracking circuit 13.

The height tracking circuit analyzes the applied binary video signals with respect to a "begin sweep" signal and provides "sweep speed control" and "vertical sweep position control" signals which are used to control the raster produced by the cathode ray scanner 1.

A horizontal sweep generator 15 and a vertical sweep generator 17 provide sweep voltages for the scanner 1. In the preferred embodiment, a positive-going vertical sweep voltage causes the beam of light to move downward and and a negative-going horizontal sweep voltage causes the beam to move to the right. The sweep generators are speed (slope) corrected by the sweep speed control signal from the height tracking circuit. Since the slope of the sweep voltage applied to the cathode ray scanner controls the sweep speed, the sweep speed control signals causes the scanning raster to be adjusted to compensate for the size of the characters that are being scanned, such that characters of various heights are scanned in a consatnt duration of time.

The vertical position of the speed-corrected raster is continuously monitored by the height tracking circuit 13 and any adjustment that is necessary is reflected in the vertical sweep positon control signal. This signal is combined with the out of the vertical sweep generator 17 in a non-inverting summing amplifier 19 and the resulting signal is applied as the vertical sweep to the cathode ray scanner 1. In this manner, the line of printed characters is tracked (followed) even when skewed, non-linear or distorted.

Figure 2:
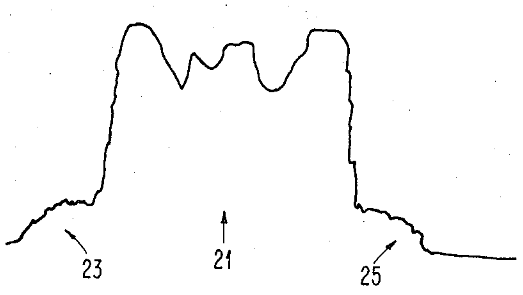
FIG. 2 is a diagram illustrating a typical vertical distribution of video for a line of printing.

As the line of print is scanned by a raster of adjacent vertical scans, a video distribution of the type shown in FIGURE 2 is obtained, where the top portions of the scanned characters provide the data shown in the left side of the distribution and the bottom portions of the characters correspond to the right side of the distribution. The lower case characters (such as "a," "c," "e") which contains no ascending or descending portions provide the bulk of the video data and are contained in region 21 in the distribution in FIGURE 2. Characters with ascenders (such as "b," "d," "f") provide video data in region 23 of FIGURE 2, while characters with descenders (such as "g," "j," "q") provide data in region 25. Characters with ascenders or descenders also provide data in region 21.

Steep vertical slopes occur between hte regions in the distribution in FIGURE 2. These steep-sloped zones are tracked by the height tracking circuit 13 (FIGURE 1) to monitor the scanning raster such that the width and position of region 21 is maintained constant. This is accomplished by analyzing the vertical distribution of video data by comparison (correlation) with predetermined reference data to continually provide sweep speed control and vertical sweep position control signals which continuously control the scanning raster in a manner which maximizes the comparison. That is, when the scanning raster is incorrect in speed or position, the corresponding control signals vary the raster to compensate for the error. The operation of the height tracking circuit is described in detail subsequently with respect to FIGURES 5 and 6.

Figure 3:
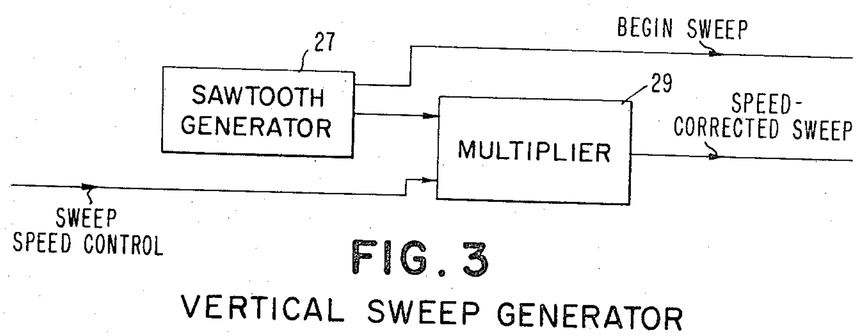
FIG. 3 is a diagram of a vertical sweep generator that is suitable for use in the preferred embodiment that is shown in FIG. 1.

A vertical sweep generator that is suitable for use in the preferred embodiment of the invention is shown in FIGURE 3. A conventional sawtooth generator 27 repeatedly produces a voltage which increases with time for a fixed duration. A suitable sawtooth generator is shown in FIGURE 13.9 at page 194 of a text entitled "G.E. Transistor Manual," sixth edition, 1962, and published by the General Electric Company. This voltage is applied to a multiplier 29 which generates the speed-corrected sweep signal as the product of the sawtooth voltage and the sweep speed control signal (generated by the height tracking circuit 13 in FIGURE 1). A suitable multiplier is shown and described in a text entitled "Analogue Computation" by Stanley Fifer, published by the McGraw-Hill Book Company in 1961, Library of Congress Catalog Card Number 58–11170 at pages 127–129. Thus, the vertical sweep speed is automatically adjusted by the sweep speed control signal to compensate for the size of the characters that are being scanned. The sawtooth generator also provides a "begin sweep" signal as each sawtooth waveshape is initiated.

Figure 4:
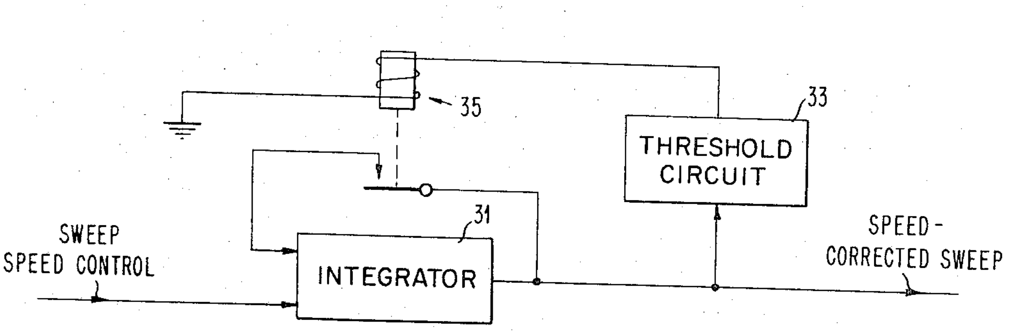
FIG. 4 is a diagram of a horizontal sweep generator that is suitable for use in the preferred embodiment that is shown in FIG. 1.

A horizontal sweep generator that is suitable for use in the preferred embodiment of FIGURE 1 is shown in FIGURE 4. An inverting integrator 31 generates a negative-going sawtooth voltage having a slope that depends upon the sweep speed control signal. This voltage is applied to a threshold circuit 33 which, when a predetermined voltage is reached, produces a signal to operate a relay 35 whose contacts reset the integrator to initiate the production of the next sweep cycle (to cause the next lower line of printing to be scanned). The slope of the horizontal sweep voltage (dependent upon the sweep speed control signal) is greater when scanning large characters then when scanning small characters to provide about the same number of scan lines for large or small characters.

Figure 5:
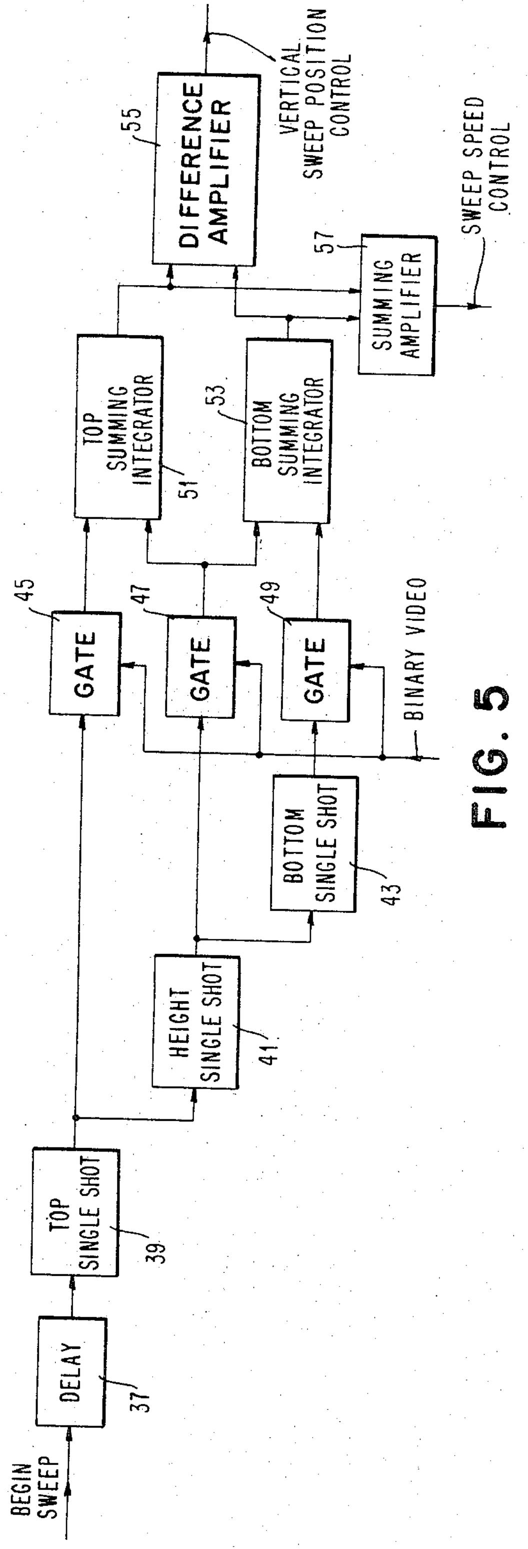
FIG. 5 is a diagram of a height tracking circuit that is suitable for use in the preferred embodiment that is shown in FIG. 1.
Figure 6:
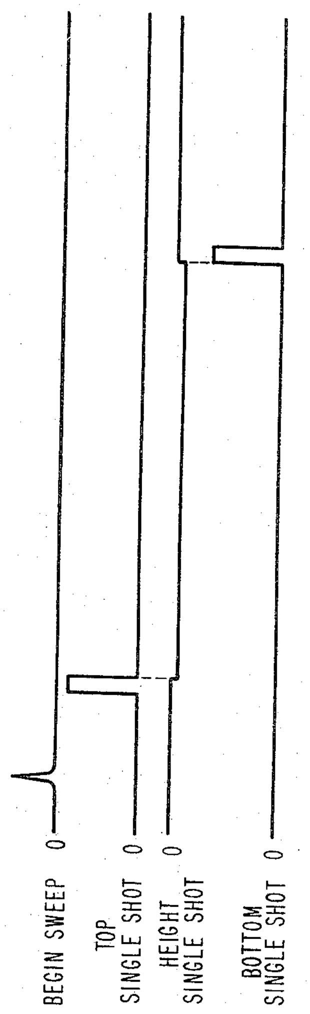
FIG. 6 is a group of waveform diagrams illustrating the operation of certain circuits shown in FIG. 5.

The height tracking circuit 13 is shown in detail in FIGURE 5 and several related idealized waveshapes are illustrated in FIGURE 6. The begin sweep signal from the vertical sweep generator is applied through a delay circuit 37 to trigger a single shot 39, which generates a large positive pulse as shown in FIGURE 6. The trailing edge of this pulse triggers another single shot 41 which generates a negative pulse of relatively long duration, as shown in FIGURE 6. The trailing edge of this pulse, in turn, triggers another single shot 43 which generates another large positive pulse, as shown in FIGURE 6. Each positive pulse contains an area that is double the area above the long duration negative pulse. In operation, the negative pulse generated by the height single shot 41 coincides in time with region 21 in FIGURE 2 and the positive pulses generated by the top and bottom single shots 39 and 43 occur at the edges of region 21. The delay 37 (FIGURE 5) permits the vertical sweep to begin at some time before the data is scanned (above the ascenders in the line of print being scanned).

The pulses generated by single shots 39, 41 and 43 are applied to a group of gates 45, 47 and 49, each of which passes the corresponding pulse level when conditioned by a coincident video signal. A top (inverting) summing integrator 51 is responsive to the pulses generated by the top and height single shots 39 and 41, and a bottom (inverting) summing integrator 53 is responsive to the pulses generated by the height and bottom single shots 41 and 43. Since the output pulse from the height single shot 41 is negative and relatively small in amplitude and the output pulses from the top and bottom single shots 39 and 43 are positive and sufficiently large in amplitude such that each of the areas under the positive pulses is double the area above the negative pulse, the resultant signals (positive and negative) applied to each integrator are balanced when the center of each positive pulse coincides in time with the midpoint of the corresponding steep-sloped boundary of region 21 in FIGURE 2. The integrator input signals are unbalanced when the raster is improperly adjusted and this unbalance automatically modifies the integrator output signals to alter the raster in a manner which counteracts the improper adjustment.

The integrator output signals are applied to a difference amplifier 55 which subtracts the output of the bottom integrator 53 from the top integrator 51 to develop the vertical sweep position control signals for the summing amplifier 19 in FIGURE 1. When the system is properly adjusted, the constant-voltage outputs from the balanced-input integrators cause a constant sweep position control signal to be generated. When the vertical sweep position is improperly adjusted (as when the line of print is skewed or distorted) the integrator input signals are temporarily unbalanced causing the integrator output signals to change, which in turn, alter the sweep position control signal from the difference amplifier 55. Referring to FIGURES 2 and 6 when the line of print is skewed or distorted, the positive pulses from the top and bottom single shots are not positioned at the edges of region 21, but rather, both positive pulses are displaced in the same direction, resulting in one pulse entering region 21 from the edge of the region, the other pulses moving from the edge of the region into one of the adjacent regions 23 or 25 (depending upon the direction of the error in the position of the line of print). In this case, the resultant signal at one integrator input is positive and the resultant signal at the other integrator input is approximately equal in amplitude but negative. This causes the output of one integrator to increase while the other decreases. Thus, the output of the difference amplifier 55 changes which, in turn, alters the vertical sweep position (through summing amplifier 19 in FIGURE 1) to correctly position the raster on the line of print.

The vertical sweep speed is also controlled by the signals from the integrators 51 and 53. These signals are applied through an inverting summing amplifier 57 to the vertical and horizontal sweep generators 15 and 17 in FIGURE 1. As described above, when the raster is properly positioned, the resultant signals that are applied to the integrators are zero and the integrator outputs are constant, causing the output of summing amplifier 57 to be constant. When the sweep speed is excessive or insufficient for the size of the characters being scanned, one resultant integrator input signal changes from zero, causing the integrator output signals to change with respect to each other which, in turn, alters the output signal from summing amplifier 57. Non-zero resultant input signals are applied to both integrators under some conditions of incorrect sweep speed but, in this case they are not both equal in amplitude and opposite polarity (as in the case when the vertical position requires correction) and, hence, the effect in the integrators is not balanced, and the output of summing amplifier 57 changes to automatically correct the sweep speed. For simplicity, the above description of the operation of the system presumes that either sweep speed or position requires correction. In general, a change in character size requires a correction of both sweep speed and sweep position because a correction of speed usually causes a positioning error. In operation, both types of correction are automatically performed simultaneously and stability is achieved (zero resultant signals to both integrators) when the raster is corrected for sweep speed and position.

The sweep speed control system is also applied to the horizontal sweep generator because a change in character height usually signifies a change in character width.

The inventive scanning apparatus automatically accommodates characters of various sizes occurring in lines of print which may be skewed, distorted or non-linear. The use of this apparatus enhances the operation of an associated recognition system by registering and normalizing the characters to be interpreted.

While the invention has been particularly shown and described with reference to a preferred embodiment thereof, it will be understood by those skilled in the art that various changes in form and details may be made therein without departing from the spirit and scope of the invention. For example, the beam of light may be replaced with other forms of energy, including X-ray and radar-frequency energy and the invention can be practiced on patterns other than printed characters.

What is claimed is:

1. An apparatus for scanning a line of patterns having a first energy-affecting characteristic on a document having a second and different energy-affecting characteristic comprising, in combination:
  - a document scanner for controllably directing a beam of energy at the document.
  - a controllable raster generator for controlling the scanner to cause the beam of energy to impinge on the document with a sequential raster pattern of adjacent scan lines, each of which is approximately perpendicular to the direction of the line of patterns and longer then the height of the patterns;
  - an energy-sensitive transducer responsive to the energy emanating from the document for providing indications of the energy-affecting characteristics of the document at the areas at which the beam of energy is directed;
  - comparison means responsive to the raster generator and to the transducer indications for providing comparison indications of the relative time of occurrence of the transducer indications with respect to a scan line, for each scan line;
  - integrator means responsive to the comparison indications for accumulating these indications during the occurrence of a plurality of scan lines;
  - means responsive to the accumulated comparison indication for producing a control signal;
  - and means for connecting said control signal to said raster generator to control the position of the raster scan lines in accordance with the position of the line of patterns on the document.

2. An apparatus for scanning a line of patterns having a first energy-affecting characteristic on a document having a second and different energy-affecting characteristic comprising, in combination:
  - a document scanner for controllably directing a beam of energy at the document;
  - a controllable raster generator for controlling the scanner to cause the beam of energy to impinge on the document with a sequential raster pattern of adjacent scan lines, each of which is approximately perpendicular to a direction of the line of patterns and longer than the height of the patterns;
  - an energy-sensitive transducer responsive to the energy emanating from the document for providing indications of the energy-affecting characteristics of the document at the areas at which the beam of energy is directed;
  - a first comparison means responsive to the raster generator and to the transducer indications for providing first comparison indications of the relative time of occurrence of the transducer indications with respect to a first portion of a scan line, for each scan line;
  - a second comparison means responsive to the raster generator and to the transducer indications for providing second comparison indications of the relative time of occurrence of the transducer indications with respect to a second portion of a scan line, for each scan line;
  - a first integrator means responsive to the first comparison indications for accumulating these indications during the occurrence of a plurality of scan lines;
  - a second integrator means responsive to the second comparison indications for accumulating these indications during the occurrence of a plurality of scan lines;
  - means responsive to the difference between the accumulated comparison indications for producing a control signal;
  - and means for connecting the control signal to said raster generator to control the sweep speed of the raster generator in accordance with the size of said patterns.

3. The apparatus described in claim 2, wherein said control signals connected to said raster generator controls the distance between the scanned lines in accordance with the size of the patterns.

4. The apparatus described in claim 2, wherein the position of the raster is also controlled by the first and second accumulated comparison indications.

5. An apparatus for scanning a line of patterns having a first energy-affecting characteristic on a document having a second and different energy-affecting characteristic comprising, in combination:
  - a document scanner for controllably directing a beam of energy at the document;
  - a controllable raster generator for controlling the scanner to cause the beam of energy to impringe on the document with a sequential raster pattern of adjacent scan lines, each of which is approximately perpendicular to the direction of the line of patterns and longer then the height of the patterns;
  - an energy-sensitive transducer responsive to the energy emanating from the document for providing indications of the energy-affecting characteristics of the document at the areas at which the beam of energy is directed;
  - comparison means responsive to a signal generated by the raster generator at a fixed time with respect to the occurrence of each scan line in the raster and responsive to the transducer indications which correspond to the presence of a pattern on the document, for providing comparison indications of a first polarity when these transducer indications occur during a preselected portion of the scan line and for providing comparison indications of a second polarity when these transducer indications occur during other portions of the scan line, for each scan line;

integrator means responsive to the comparison indications for accumulating these indications during the occurrence of a plurality of scan lines;

and means responsive to the accumulative comparison indications for controlling the raster generator to produce raster scan lines having a fixed relationship to the position of the line of patterns on the document.

6. An apparatus for scanning a line of patterns having a first energy-affecting charactertistic on a document having a second and different energy-affecting characteristic comprising, in combination:

a document scanner for controllably directing a beam of energy at the document;

a controllable raster generator for controlling the scanner to cause the beam of energy to impinge on the document with a sequential raster pattern of adjacent scan lines, each of which is approximately perpendicular to a direction of the line of patterns and longer than the height of the patterns;

an energy-sensitive transducer responsive to the energy emanating from the document for providing indications of the energy-affecting characteristics of the document at the areas at which the beam of energy is directed;

comparison means responsive to a signal generated by the raster generator at a fixed time with respect to the occurrence of each scan line in the raster and responsive to the transducer indications which correspond to the presence of a pattern on the document, for providing first comparison indications of a first polarity when these transducer indications occur during a first preselected portion of the scan line, for providing second comparison indications of a second polarity when these transducer indications occur during a second predetermined portion of the scan line adjacent to one end of the first portion of the scan line, and for providing third comparison indications of the second polarity when these transducer indications occur during a third predetermined portion of the scan line adjacent to the other end of the first portion of the scan line, for each scan line;

a first integrator means responsive to the first and second comparison indications for accumulating these indications during the occurrence of a plurality of scan lines;

a second integrator means responsive to the first and third comparison indications for accumulating these indications during the occurrence of a plurality of scan lines;

and means responsive to the accumulated comparison indications for controlling the raster generator to produce a sweep speed for the raster scan lines having a fixed relationship to the size of the patterns.

7. The apparatus described in claim 6, wherein the distance between the scan lines is also controlled to bear a predetermined relationship to the size of the patterns.

8. The apparatus described in claim 6, wherein the positions of the raster is also controlled by the first and second accumulated comparison indications.

References Cited

UNITED STATES PATENTS

| | | | |
|---|---|---|---|
| 3,189,873 | 6/1965 | Rabinow | 340—146.3 |
| 3,221,099 | 11/1965 | Breitbord | 178—6.8 |
| 3,223,973 | 12/1965 | Chatten | 340—146.3 |
| 3,231,860 | 1/1966 | Chatten | 340—146.3 |
| 2,864,556 | 12/1958 | Raymond | 328—127 |
| 2,915,632 | 12/1959 | Moore | 328—127 |
| 3,047,820 | 7/1962 | Lawton | 328—127 |
| 3,240,942 | 3/1966 | Birnbaum | 178—6.8 |

JOHN W. CALDWELL, *Primary Examiner.*

DAVID G. REDINBAUGH, *Examiner.*

J. A. ORSINO, *Assistant Examiner.*